US012791347B2

(12) United States Patent
Eisenmann et al.

(10) Patent No.: US 12,791,347 B2
(45) Date of Patent: Nov. 10, 2026

(54) METHOD AND PROCESSING CIRCUIT FOR OPERATING DIGITAL ASSISTANCE SYSTEM FOR RECEIVING SEARCH QUERY AND PROVIDING BEST TRAVELING ROUTE TO DESTINATION INDICATED BY SEARCH QUERY

(71) Applicant: CARIAD SE, Wolfsburg (DE)

(72) Inventors: Andre Eisenmann, Nuremberg (DE); Andreas Heimrath, Emmering (DE)

(73) Assignee: CARIAD SE, Wolfsburg (DE)

( * ) Notice: Subject to any disclaimer, the term of this patent is extended or adjusted under 35 U.S.C. 154(b) by 62 days.

(21) Appl. No.: 18/575,773

(22) PCT Filed: Jul. 6, 2021

(86) PCT No.: PCT/EP2021/068584
§ 371 (c)(1),
(2) Date: Dec. 29, 2023

(87) PCT Pub. No.: WO2023/280384
PCT Pub. Date: Jan. 12, 2023

(65) Prior Publication Data
US 2024/0318976 A1 Sep. 26, 2024

(51) Int. Cl.
*G01C 21/36* (2006.01)

(52) U.S. Cl.
CPC ..... *G01C 21/3682* (2013.01); *G01C 21/3629* (2013.01); *G01C 21/3694* (2013.01)

(58) Field of Classification Search
CPC ............ G01C 21/3682; G01C 21/3629; G01C 21/3694
See application file for complete search history.

(56) References Cited

U.S. PATENT DOCUMENTS 7,831,433 B1 * 11/2010 Belvin .................... G10L 15/18 704/275
2019/0179860 A1 * 6/2019 Gizzi Giaimo ........ G06Q 30/02

FOREIGN PATENT DOCUMENTS

EP 3451189 A1 3/2019

OTHER PUBLICATIONS

Ahuja et al., "Movie Recommender System Using K-Means Clustering and K-Nearest Neighbor," 2019 9th International Conference on Cloud Computing, Data Science & Engineering (Confluence), Noida, India, Jan. 10-11, 2019, pp. 263-268. DOI: 10.1109/CONFLUENCE.2019.8776969.

* cited by examiner

*Primary Examiner* — Adnan M Mirza
(74) *Attorney, Agent, or Firm* — Seed Intellectual Property Law Group, LLP

(57) ABSTRACT

The disclosure is concerned with a method for operating a personal digital assistance system, wherein the method comprises that a processing circuit performs the step of receiving a search query expressed by a user for requesting answer data as an answer to the search query. The search query concerns a travel route and/or a specific travel destination and/or a point of interest, POI. The method is characterized in that in a selection step the processing circuit selects at least one of several selectable retrieval systems as the respective best retrieval system to which feature data of the search query are to be sent for obtaining the answer data.

17 Claims, 2 Drawing Sheets

METHOD AND PROCESSING CIRCUIT FOR OPERATING DIGITAL ASSISTANCE SYSTEM FOR RECEIVING SEARCH QUERY AND PROVIDING BEST TRAVELING ROUTE TO DESTINATION INDICATED BY SEARCH QUERY

BACKGROUND

Technical Field

The disclosure is concerned with a method and a processing circuit for operating a digital assistance system. The method comprises that the processing circuit receives a search request or search query concerning a travel route and/or a specific travel destination and/or a specific point of interest, POI. Feature data is generated from the search query and the feature data is sent to a selected retrieval system (i.e., IRS—information retrieval system) that is designed to retrieve answer data on the basis of the feature data. The disclosure is also concerned with a method and a processing circuit for generating a mapping function for selecting the best retrieval system for answering the specific search query.

Description of the Related Art

Information retrieval systems (or in short: retrieval systems) are of great importance for digital assistance system or personal intelligent assistants (PIAs) or personal digital assistance systems, such as smartphones or infotainment systems in vehicles, and also for cloud-based digital assistant systems such as the service Siri®. For retrieving information, several competing machine learning-based retrieval systems may be contacted, e.g., for route prediction or for responses to other user search queries. However, contacting several such retrieval systems may result in unnecessary high data traffic and also in different search results and such in ambiguous answer data that may confuse the user. Also, the quality of the search result (i.e., the information contained in the answer data) may vary between the retrieval systems depending on the type of search query. A retrieval system may also be operated as a prediction system, i.e., for route prediction.

BRIEF SUMMARY

It is an objective of the present disclosure to make use of several selectable retrieval systems effectively for requesting answer data concerning travel routes and/or travel destinations in a digital assistance system.

As one aspect of the solution, the disclosure provides a method for operating a digital assistance system, such as an infotainment system in a vehicle or a smart device (e.g., a smart phone or a smart watch or a tablet PC). The method comprises that a processing circuit performs the following steps:

- receiving a search query expressed or provided by a user requesting answer data as an answer to the search query, wherein the search query concerns a travel route and/or a specific travel destination and/or point of interest, POI,
- identifying or recognizing in the search query at least one predefined keyword describing the search query, e.g., by parsing the search query for keywords,
- generating feature data that contains or describe the at least one recognized keyword and/or the search query,
- sending the feature data to at least one selected retrieval system that is designed to retrieve the answer data on the basis of the feature data.

The user may provide the search query, for example, as a speech input or by manually entering the search query into a user interface of the digital assistance system. The search query may, for example, demand an answer to the question for the shortest or quickest or most economic or most picturesque route to a specific travel destination and/or through a specific region. Another possible search query may concern a POI, e.g., a charging station for an electric vehicle or a gas station or a restaurant, just to name a few examples. The search query may be provided in natural language, i.e., the user may speak or express the search query as though the user was talking to another person. The feature data can be generated by identifying the at least one predefined keyword using, e.g., a parsing algorithm. The feature data can contain the at least one recognized keyword itself. Additionally or alternatively, the original search query itself may be contained in the feature data. Using the at least one recognized keyword provides the additional benefit that a predefined query structure can be applied as opposed to a query expressed in natural language. Data can each be represented as digital data, like, e.g., bits and/or bytes.

As is known from the prior art, the retrieval system will receive the feature data and provide a corresponding answer in the form of answer data. For example, the answer can be navigation data for a navigation system of the digital assistance system. The respective retrieval system may be based, for example, on a machine-learning search algorithm, e.g., an artificial neural network. For example, the retrieval system may be an internet-based service for providing a travel route or identifying a point of interest that matches criteria given in the feature data.

In order to make use of several retrieval systems and still be able to avoid unnecessary data traffic and to obtain the best quality search result, in the processing circuit, link information for at least two selectable retrieval systems are kept stored or provided. The processing circuit may be based on at least one microprocessor. In the processing circuit, a data storage may store the link information that enables the processing circuit to send feature data to any one of the selectable retrieval systems. Link information can be, for example, a URL (unified resource locator), an IP-address (IP—internet protocol) and/or an API (application programming interface) for connecting to the respective retrieval system.

In a selection step the processing circuit selects at least one of the selectable retrieval systems as the respective retrieval system to which the feature data is to be sent. This selection step comprises that selection data is provided to a mapping function of the processing circuit as an input and the mapping function maps the selection data to the link information and/or to score data of at least one of the selectable retrieval systems for identifying the retrieval system to be used for sending the feature data to. The selection data contains the search query and/or the at least one recognized keyword and/or at least a part or all of the feature data and/or additional situation data indicative of a current environment in which the user requests the answer data. Thus, from the search query, not only the feature data is generated, but also the selection data that allow to identify the at least one retrieval system that is to be selected for providing the answer data to the search query. Thus, for a specific search query, only one out of several possible selectable retrieval systems is actually selected. Alternatively, the disclosure can also be used for selecting more than one, that is some of the selectable retrieval systems. This can be done by designing the mapping function accordingly. The mapping function is a look-up function that takes the selection data as input and provides the information regarding the at least one retrieval system that is to be used. For that respective retrieval system (that is to be used) the link information is available in the processing circuit and thus the processing circuit can send the feature data to that selected retrieval system. The selection data can be identical to the feature data, but the selection data can additionally or alternatively comprise also at least a part of the at least one identified or recognized keyword. In addition to or alternatively to directly providing the link information, score data can be provided for some or all of the selectable retrieval systems, wherein the score data indicate an estimated suitability or quality of the respective retrieval system for providing the answer to the current search query in question. The score data may comprise of a score value for ranking the retrieval systems.

The disclosure provides the advantage that a digital assistance system can take into account the fact that for different search queries, different retrieval systems may be more suitable than other retrieval systems. Thus, the mapping function chooses the respective best retrieval system for a respective search system. To this end, the search query is represented by the selection data that is then mapped to the identity of the at least one most suitable retrieval system that will then be provided with the feature data of that search query. Thus, only one or only a few retrieval systems need to be contacted for answering a single search query and by use of the mapping function it is ensured that the retrieval system that provides the most reliable answer data will be chosen. How the mapping function can be designed will be explained in more detail further below.

The disclosure also comprises further developments that provide features which afford additional technical advantages.

One further development comprises that the mapping function comprises a look-up table and/or an artificial neural network that associates several different possible inputs to the respective link information or to the score data, wherein the score data describes a score of a predefined quality measure for each selectable retrieval system for comparing the retrieval systems. The artificial neural network may be trained to map selection data to the identity of a suitable or the best retrieval system. The look-up table can have entries for several different sets of selection data and for each set, the identity or link information for a suitable retrieval system may be provided. Additionally or alternatively to using the link information as an output, a score may be provided for each selectable retrieval system. The mapping function therefore provides in an intermediate step information on how each selectable retrieval system is expected to perform. This enables the method to choose more than one retrieval system, e.g., the three best or the two best retrieval systems for providing an answer to the current search query. For generating a class-based input for the look-up table and/or the artificial neural network, the following k-means clustering algorithm may be used.

One further development comprises that the mapping function comprises a k-means clustering algorithms where a respective query class that represents several different possible sets of selection data (i.e., several different inputs describing a respective combination of keywords) is provided as a cluster in a feature space and the input is mapped into the feature space and the cluster closest to the mapped input determines the retrieval system that is to be used. As a distance measure for determining the distance of the mapped selection data, i.e., the point in the feature space that describes or that represents the current set of selection data (i.e., the current input), to the respective cluster, can be measured as a Manhattan distance or the Euclidean distance. The Manhattan distance makes it possible to determine a distance for quantities that are not expressed by numbers, e.g., categories. The Euclidean distance can be used if the selection data represents quantities that are expressed by numbers. Such a category may be derived by mapping the at least one recognized keyword into one out of several categories. This can be achieved, for example, by grouping several possible keywords into one single keyword group (i.e., a category), for example, the keywords quick, hurry, fast, urgent into the keyword group "fastest route" and/or the keywords restaurants, diner, fast food into the keyword group "POI for food." By providing keyword groups that represent several different expressions of the same meaning, several possible keywords can be presented by one single keyword group. A point in the feature space can then be a collection of keyword groups, for example, the keyword groups "fastest route" and "POI for restaurant" can be combined to form the point "closest restaurant," which in turn may fall into the cluster "search for closest POI" as one possible cluster. Thus, for mapping keywords to a query class, different individual exemplary or historic search queries can be grouped by a k-means cluster algorithm and the keywords extracted from a search query can be mapped into a feature space where the clusters form the k-means. For each cluster it can be determined in advance (using the exemplary or historic search queries) which retrieval system is best (according to a predefined quality measure) and/or which average score each retrieval system achieves (average for all search queries. Thus, the current search query represented by the recognized keywords may be mapped into the feature space and the distance to the different clusters can be measured. The cluster that is closest can be determined and the retrieval system associated with that query class can be selected or identifies by the mapping function.

One further development comprises that the input to the mapping function describes different parameters (e.g., type of POI and/or price category) and for mapping the input into the feature space, one or some or each of the parameters is associated with a category and/or the respective numerical value of the parameter is used as a coordinate value in the feature space. For representing the selection data, i.e., for example, the at least one keyword and/or the search query itself, in the feature space, the selection data may be expressed as coordinates of a point in a coordinate system the feature space. For each coordinate, one property or parameter expressed by the selection data can be used. For example, one coordinate can describe a type of the query (search for news, destination, sports events, traffic information, weather information). Another coordinate can represent a category of price (e.g., budget, mid-range, luxury). Thus, the search query looking for a luxury restaurant defines a point in the feature space along the described two coordinates type and price. If the search query defines parameters that use numerical values, e.g., temperate values or time values, these numerical values can be directly used as a coordinate in the feature space.

One further development comprises that the situation data describes:

- a current position of the digital assistance system, the position being expressed by geo coordinates (e.g., GPS position) and/or by indicating a region and/or region type (e.g., town, countryside) in which the digital assistance system is positioned;

a time of day and/or a season of the year;

a current weather and/or an estimated future weather as signaled by a weather station;

a current traffic and/or an estimated future traffic as indicated by a traffic surveillance system.

It has been observed that the quality of the answer to a search query may differ within one and the same retrieval system depending on the current environmental situation as it may be described by the situation data. Thus, providing situation data of the described type (e.g., the current position of the user and the digital assistance system) can help selecting the best retrieval system for the current situation regarding the environment. For example, a retrieval system for finding a specific point of interest may in general provide a good recommendation as answer data but it may not consider the current traffic situation, such that the user who tries to travel to that point of interest as recommended in the answer data may experience difficulties due to a traffic jam. Another retrieval system may provide less favorite recommendations as answer data, but that retrieval system may instead consider the current traffic situation. Thus, distinguishing between the retrieval systems on the basis of situation data describing the current traffic situation provides a further benefit in selecting the retrieval system.

One further development comprises that generating the feature data (that are sent to the at least one selected retrieval system) further comprises adding the situation data as a part of the feature data. The situation data may also be used as a further input for the selected retrieval system such that in the retrieval system the current situation of the user is known and can be considered in the search for the answer data.

One further development comprises that the digital assistance system is operated in a vehicle. The vehicle with the infotainment system is preferably designed as a motor vehicle, in particular as a passenger vehicle or a truck, or as a bus or a motorcycle. In a vehicle, access to many different retrieval systems may be provided such that the method for selecting only one or only several of those for providing an answer to a specific search query helps operating the digital assistance system efficiently.

One further development comprises that the processing circuit is operated as an integral part of the digital assistance system or wherein the processing circuit is provided as a distributed circuit that is partly operated in the digital assistance system and partly operated in a stationary server (e.g., a server of the internet). In other words, the processing circuit may also be provided at least in part outside, for example, a vehicle or in general outside the digital assistance system by providing it as a part of a stationary server. Such a server can be, for example, an internet server or cloud server. If the processing circuit is provided as a distributed circuit, the different parts of the processing circuit may be linked using a communication link, e.g., an internet connection. In the case of a vehicle, such a connection may comprise a wireless link, for example, a Wi-Fi link or a mobile communication link.

A further development comprises that the method comprises the following steps for receiving the search query:

receiving an acoustic speech signal of the search query spoken by a user, recognizing in the received speech signal the at least one keyword contained in the speech signal.

The user may therefore express the search query as spoken words that are recorded by the digital assistance system, using, for example, a microphone or a microphone array. The acoustic speech signal may then be transformed into words using, for example, a speech recognizer, as it may be based, for example, on a Hidden-Markov-Model or a support vector machine. This may yield the acoustic speech signal as a written text that is represented digitally in the processing circuit where the already described parsing for the at least one keyword may be performed. The parsing may be based on a set of possible keywords that may be provided in a storage of the processing circuit. For finding an appropriate set of possible keywords, experiments may be made where users are asked to express a search query for solving a specific task, e.g., for finding the nearest restaurant. This will provide a selection of keywords that will most likely be used by human users for expressing a search query. On the basis of these keywords, the set of possible keywords for running the parser for the parsing of the received search query may be generated.

As one aspect of the solution, the disclosure provides a method for training the mapping function for selecting one or at least one retrieval system out of several selectable retrieval systems. Each selectable retrieval system is designed for retrieving answer data on the basis of feature data that describes a search query. The search query concerns a travel route and/or a specific travel destination and/or point of interest, POI. The method comprises that for several different search queries that are each represented by respective feature data, the following steps are performed:

sending the feature data to each of the selectable retrieval systems and receiving respective answer data from each of the retrieval systems as an answer to the search query, applying a predefined evaluation function that compares the answer data of the retrieval systems among each other based on a predefined quality measure and that identifies the best retrieval system which provided the answer data with the smallest or largest value with respect of the quality measure, associating the feature data and/or the underlying search query and/or at least one keyword contained in the search query with the best retrieval system in the mapping function such that the mapping function will identify the best retrieval system in reaction to an input comprising the feature data.

The search queries that form the basis for the training of the mapping function can be test queries as they can be generated in a laboratory and/or on test drives in vehicles as it has been described above (historical search queries). For each of these search queries the feature data can be generated in the described form. Then, these feature data is used to test each selectable retrieval system in order to obtain answer data from each of the retrieval systems. For comparing these different sets of answer data with regards to their usefulness or their quality, a quality measure is applied. The present method uses a quality measure that allows to compare the retrieval systems amongst each other such that no absolute value is needed, but only the relation between the retrieval systems is needed as described by the quality measure. Thus, no subjective evaluation is needed. This makes the training of the mapping function especially effective. The mapping function can be designed as a look-up table and/or an artificial neural network and/or a k-means cluster, like it has already been described above.

A suitable quality measure thus allows to compare the results of the retrieval systems in an automated way without the need of a human operator to evaluate the results, the following quality measures have been found suitable.

A further development comprises that the quality measure comprises a travelling distance and/or haversine distance from a current position of the user to a respective destination that is indicated in the answer data and/or a time it takes to reach the respective destination.

Thus, for each search query, a current position can be associated where a user might express these search queries. Then, the travelling distance can be calculated, that is the distance that actually needs to be travelled along roads for reaching the destination that has been recommended in the answer data. By taking into account the time it takes to reach the destination, the current traffic situation may also be taken into account. For applying these quality measures, the search queries can be collected during the described test drives. For determining the time it takes to reach a respective destination, a simulation can be performed such that the answer data of each of the retrieval systems can be verified with regards to the time it takes to reach the destination recommended by that retrieval system.

A further development comprises that the quality measure comprises that the answer data is temporarily stored in a storage and the user is observed with regard to a travel route that is actually taken by the user and/or with regard to a next travel stop and the retrieval system that predicted the travel route and/or the travel stop best by its answer data, is then identified as the best retrieval system for that search query. If test drives are performed or if the mapping function is trained in a digital assistance system that is already in use, several recommendations based on the set of user data received from the several retrieval systems may be provided to a user. Then, the user selects or makes a decision based on these several sets of user data and the user is observed with regards to which choice the user actually makes, i.e., which of the recommended destinations the user actually selects. This is then used for identifying the best retrieval system for that search query.

A further development comprises that the quality measure comprises that a probabilistic score is used that combines the results of several of the search queries for identifying the respective best retrieval system by using an artificial neural network and/or a k-means algorithm for representing several different possible combinations of keywords as a single query class. In other words, for selecting the best retrieval system, several search queries are evaluated. This can be performed by using the already described k-means algorithm and/or an artificial neural network.

A further development comprises that the previously describes method for operating the digital assistance system on one side and the method for providing or training the mapping function on the other side are performed alternatingly several times for iteratively training the mapping function in order to adapt the mapping function to a change in the retrieval systems. As has already been described, for training the mapping function, real search queries from a digital assistance system that is already in use can be taken into account. Thus, while a user uses the digital assistance system, during a training phase, several or all of the selectable retrieval systems may be provided with the feature data and the returned sets of user data from the different retrieval systems may also be used for training the mapping function. This training phase may be performed at intervals such that the mapping function may change or may be adapted if the retrieval systems change, for example, due to updates or due to a change in their algorithms. Thus, if a retrieval system is based on an artificial neural network that is retrained such that its search behavior may change, the mapping function may reflect this change in behavior if the mapping function is also trained again.

As one aspect of the solution, the disclosure provides a processing circuit comprising at least one microprocessor, wherein the processing circuit is designed to perform an embodiment of the described methods. In the processing circuit, a data storage may be provided that may store programming instructions that make the processing circuit perform the method if executed by the at least one microprocessor. These instructions may be provided as a computer program or a software for the at least one microprocessor.

The disclosure also comprises the combinations of the features of the different embodiments.

BRIEF DESCRIPTION OF THE SEVERAL VIEWS OF THE DRAWINGS

In the following an exemplary implementation of the disclosure is described.

DETAILED DESCRIPTION

The embodiment explained in the following is an advantageous embodiment of the disclosure. However, in the embodiment, the described components of the embodiment each represent individual features of the disclosure which are to be considered independently of each other and which each develop the disclosure also independently of each other and thereby are also to be regarded as a component of the disclosure in individual manner or in another than the shown combination. Furthermore, the described embodiment can also be supplemented by further features of the disclosure already described.

In the figures identical reference signs indicate elements that provide the same function.

Figure 1:
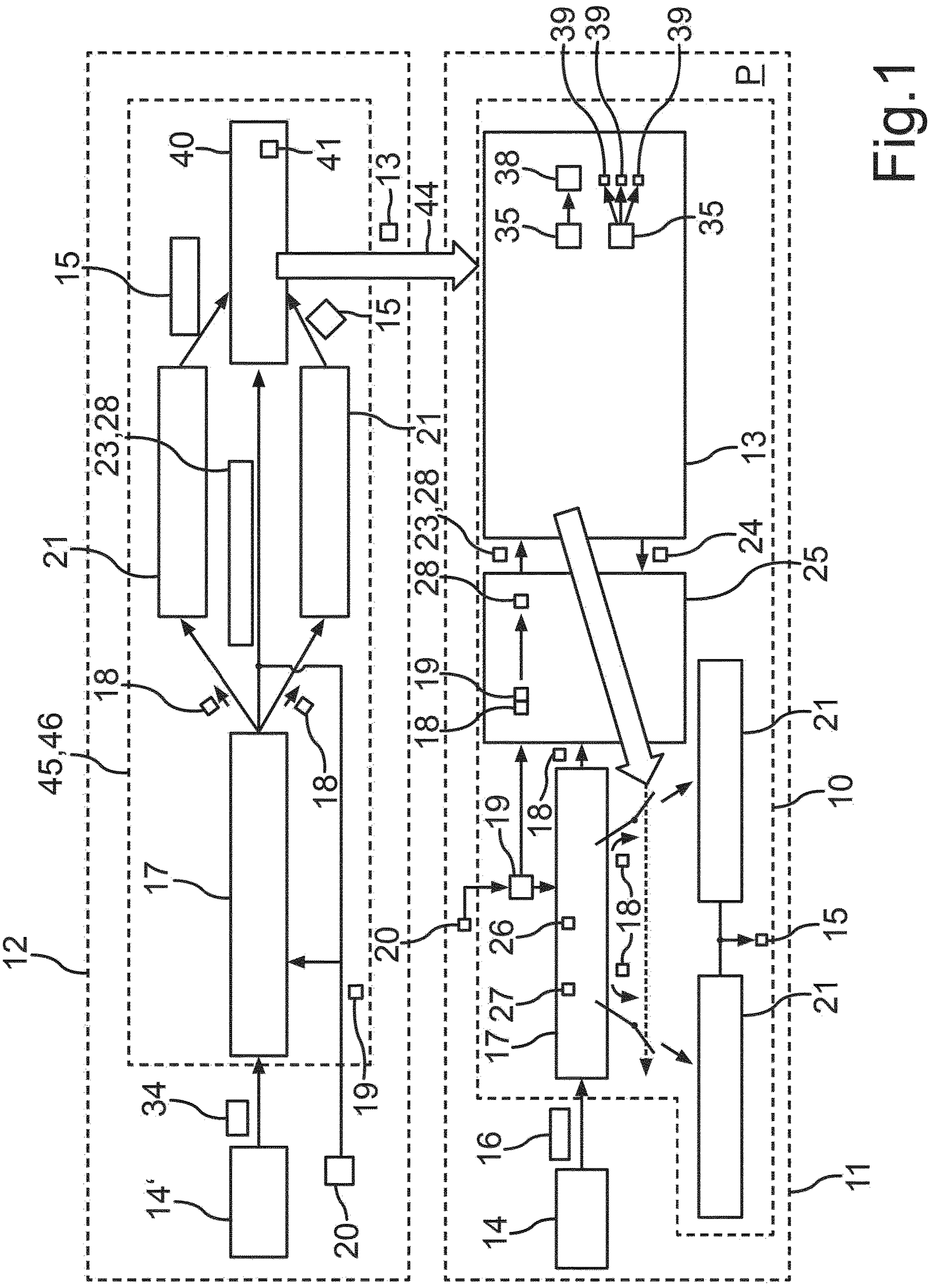
FIG. 1 shows a schematic illustration of a digital assistance system with an embodiment of the inventive processing circuit performing an embodiment of the inventive methods.

FIG. 1 illustrates a personal intelligent assistant (PIA), that represents a digital assistance system 10 that may be provided as an infotainment system in a vehicle. Alternatively, the digital assistance system 10 may be provided, for example, in a smart device, e.g., a smartphone or a smartwatch or a tablet PC. For operating the digital assistance system, a method 11 for operating the system 10 may be provided. Additionally, for enabling the method 11, a method 12 for training a mapping function 13 may be provided. One or each method may be performed by a processing circuit P that may execute machine-readable programming instructions of a corresponding software.

On the basis of method 11, a user 14 may use the digital assistance system 10 to obtain or retrieve answer data 15 that provides an answer to a search request or search query 16 that the user 14 may express or pose to the digital assistance system 10. For example, the user 14 may pose the search query 16 using spoken language. In the digital assistance system, the search query 16 may be received, for example, by a translation module 17 that may generate feature data 18 from the search query 16. For generating the feature data 18, additional situation data 19 may be provided from at least one additional data source 20. For example, situation data 19 may provide the current position (e.g., coordinates determined using a GNSS—global navigation satellite system).

The feature data 18 may be sent to one of several information retrieval systems or retrieval systems 21. For example, such a retrieval system can be provided in the internet as a search service. An example for such a retrieval system can be Google Maps®, Here®, just to name examples. From the chosen or selected retrieval system 21, the user data 15 may be received that may then be provided to the user 14 as the answer to the search query 16. For example, the user data 15 may be presented on a display of the digital assistance system 10 and/or they may be used to program a navigation system and/or they may be output using a text-to-speech system. For selecting one of the several selectable retrieval systems 21, the mapping function 13 may be applied. The selection function 13 can be designed to receive selection data 23 as an input and to map the received selection data 23 to output data 24. The output data 24 may, for example, describe the identity of the retrieval system 21 that is to be used or shall be selected for sending the feature data 18 to. Alternatively, the output data 24 may describe a score for each retrieval system 21 such that it is known which retrieval systems 21 are the N best retrieval systems, e.g., the first two best systems. The selection data 23 may be generated, for example, by a selection module 25 that may use the feature data 18 and the situation data 19 to generate the selection data 23. The selection module 25 may also control to which retrieval system 21 the feature data 18 are sent depending on the output data 24 from the mapping function 13.

The mapping function 13 may be based, for example, on a rule that may be implemented as a look-up table and/or it may be based on an artificial neural network.

The selection module 25 may, for example, concatenate the feature data 18 and the situation data 19 to generate the selection data 23. From the output data 24, the selection module 25 may either derive the link information, for example, a URL or an internet address of the retrieval system 21 that is most suitable for the type of search query 16 received from the user 14. Alternatively, if the output data 24 lists the scores of all selectable retrieval systems 21, the selection module 25 may select the top N best retrieval systems 21 according to the scores given in the output data 24.

For generating the feature data 18, the translation module 17 may, for example, parse the search query 16 for several given possible keywords 26. Such keywords 26 can be, for example, restaurant, supermarket, weather, tomorrow, today, fastest route, nicest route, just to name a few examples. The situation data 19 may describe the current position, the current time, the type of region (e.g., countryside or town) just to name a few examples. The corresponding data source 20 can be, for example, a receiver for a position signal of a GNSS, for example, a GPS receiver (GPS—global positioning system), and/or an internet service, e.g., a weather service and/or a traffic service.

Based on the keywords 26 that are found in the search query 16 by the parser 27, the feature data 18 may be generated.

In the selection module 25, the feature data 18 or in general the keywords 26 recognized or found in the search query 16 and the selection data 19 (if present) may be mapped to a query class 28 that may be the basis for the selection data 23. For example, the selection data 23 can describe or indicate the query class 28.

Figure 2:
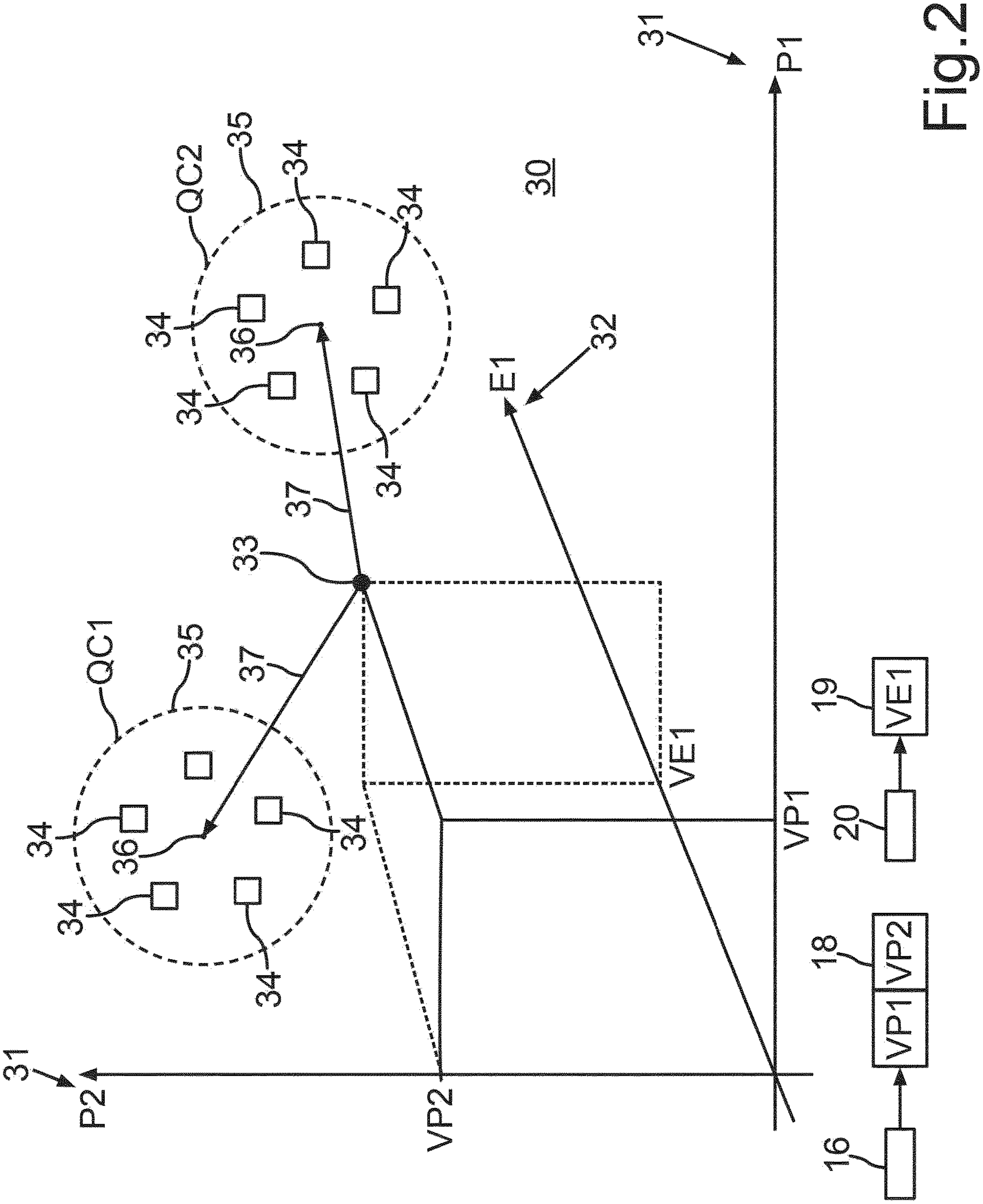
FIG. 2 shows a sketch for illustrating the generation of feature data and a mapping function.

FIG. 2 illustrates, how the mapping of feature data 18 and situation data 19 to a query class 28 can be performed on the basis of a k-means clustering.

FIG. 2 illustrates a feature space 30 that can be defined by coordinates describing search parameters 31 and environmental parameters 32. Exemplary search parameters 31 are shown here as P1, P2, wherein more than only two parameters 31 may be provided in the feature space 30 as additional coordinates. Examples for parameters 31 are: destination type (restaurant, gas station, home address, work address) and type of travel (fastest route, economic route, picturesque route) and travel reason (business, leisure, family trip). More or less than the two illustrated search parameters 31 may be used. Examples for an environmental parameters 32 are shown here as μl, whereas more than only one environmental parameter 32 may be used as a coordinate in the feature space. Examples for environmental parameters are: current time of day, current season of year, traffic density in the surroundings, type of region, current user position. In the feature data 18 extracted from the current search query 16, specific values for the different search parameters 31 may be given. For example, for the parameter P1, a specific value VP1 and for the parameter P2 a specific value VP2 may be given. Accordingly, from the situation data 19, a specific environmental value VE1 for the environmental parameter μl may be given. Thus, on the basis of the feature data 18 and (if used) from the situation data 19, a specific point 33 in the feature space 30 is defined by the current search query 16. From former or historic search queries 34, clusters 35 may be defined that represent typical search queries that a user may ask. Each cluster 35 may be defined by a mean value 36 that may be derived using the well-known k-means algorithm. For the current point 33 representing the current search query 16, the respective distance 37 to the mean value 36 may be calculated. For example, the distance 37 can be a Euclidian distance or a Manhattan distance. The mean value 36 closest to the current point 33 may indicate the cluster 35 to which the search query 16 is mapped. As an example, FIG. 2 shows two possible clusters QC1, QC2 each representing a typical class of search queries.

By the mapping function 13 (as shown in FIG. 1) for each cluster 35, the identity or link information 38 of the most suitable retrieval system 21 may be stored. Alternatively, for each cluster 35, a respective score value 39 may be provided for each selectable retrieval system 21 such that the retrieval systems 21 may be sorted such that for a specific cluster 35 an order of retrieval systems 21 is given showing the best retrieval system on top. This allows to choose the N-best retrieval systems 21 for obtaining or retrieving new answer data 15.

For generating the mapping function 13, the training method 12 may be applied.

In the training method 12, a test user 14' may provide a search query, that can be, for example, the already mentioned former search queries 34. On the basis of the search queries 34, the feature data 18 for those search queries 34 may be generated, for example, by the transformation module 17. Also, the situation data 19 from the at least one data source 20 may be used. Based on the feature data 18, in the training method all of the selectable retrieval systems 21 are used for obtaining or retrieving a respective set of answer data 15 from each retrieval system 21. An evaluation module 40 may then evaluate which set of user data 15, i.e., which retrieval system 21, provided the best answer to the respective search query 34. For evaluating the answer data 15, a quality measure 41 may be applied. For example, the current position of the user 14', where the search query 34 was expressed or generated, the distance to a destination that is stated in the respective user data 15 can be measured. The retrieval system 21 providing the user data 15 naming the destination with the shortest distance or smallest distance is then regarded as the best retrieval system 21 regarding the search query 34.

Instead of associating the identity of the best retrieval system 21 directly with the search query 34, each search query 34 can first be mapped into the feature space 30 as has been described in connection with FIG. 2. For example, first all the search queries 34 may be processed collecting the user data 15 and applying the quality measure 41, then from the collected search queries 34, the clusters 35 may be calculated and then for each cluster 35, a probabilistic evaluation, i.e., a statistical evaluation which retrieval system 21 performed best for the respective cluster, may be performed. Alternatively or additionally, for each cluster 35, a ranking of the retrieval systems 21 may be provided on the basis of the quality measure 41. Then, the ranking may be transformed into a score for each retrieval system 21, for example, the position in the ranking may be translated into a score number. The mapping of each cluster 35 onto the identity or ID of the best retrieval system 21 and/or a set of scores for each retrieval system 21 then provides the mapping function 13. In an implementation step 44, the mapping function 13 may be provided in the digital assistance system 10 for the user 14. The training method 12 may be performed, for example, in a vehicle 45 and/or in a cloud server 46. In a vehicle 45, the training method 12 provides the advantage that user 14' may already use the answer data 15 for travelling. In a further embodiment, the training method 12 and the method 11 for operating the digital assistance system 10 may be implemented for one and the same digital assistance system 10 or for a group of digital assistance systems 10 such that while the digital assistant systems 10 are in use, the training may continue using the new search query 16.

The described idea provides an advantage for the development of the personal intelligent assistants (PIA) in a vehicle or in a smart device and for the development of cloud-based digital assistants such as Siri®. The idea allows several competing (e.g., machine learning-based) retrieval systems, e.g., for route prediction or responses to other user search queries, to be combined and evaluated. In doing so, a learning system (mapping function) provides the user with the best matching answer to the search query from the possible answers of the different retrieval systems. Such integration and evaluation of the results of the retrieval systems is made possible with the idea. The idea improves the customer experience by integrating different retrieval systems and saving costs by eliminating inferior retrieval systems through the evaluation function.

The user submits a query to the assistant, which is transformed into a feature space, e.g., by speech processing and feature processing. In this feature space, classes or types of queries can be formed by clustering, e.g., with k-means clustering. Examples on how to implement k-means clustering can be found in the following scientific publication: Rishabh Ahuja, Arun Solanki, Anand Nayyar, "Movie Recommender System Using K-Means Clustering and K-Nearest Neighbor," 9th International Conference on Cloud Computing, Data Science & Engineering (Confluence), IEEE, 2019.

Based on the queries, e.g., the question about the next hardware store, retrievals are made by independent retrieval systems. An evaluation unit compares these retrievals based on the evaluation function. For a query about a destination such as a hardware store, the retrieval system that provides the destination closer to the user's current GPS position (driving distance or haversine distance) is judged to be better, i.e., the quality measure is the distance to the current user position. Alternatively, the suggestions can be cached in memory and the retrieval system whose suggestion is closer to the actual next stop on the trip is judged to be better.

A probabilistic score per query class and retrieval system can be formed from the number of better results across all queries. These scores can be used to target further development of the retrieval systems. The scores can also selectively assign future queries to the retrieval system with the better score for that query class. This can be viewed as a learning system for which the scores are learned during a training session in a fleet of vehicle or smart devices.

This yields learning system by which the user can get the best matching answer to his query from the possible answers of the different retrieval systems in a mapping function. Moreover, the idea provides a procedure on how to use the evaluation function for assigning queries to retrieval systems. These indicators can also be used to improve the retrieval systems.

The following features have been proven to be especially beneficial:

- Digital assistant connected with at least two retrieval systems, where the user gets the answer that best matches a search query from the possible answers of the different retrieval systems.
- Method used for this purpose to determine the quality of the retrieval systems depending on the query class.
- Procedures for determining clusters for query-dependent evaluation of retrieval systems.
- Procedure to coordinate at least two retrieval systems in a digital assistant.

Overall, the example shows how a learning system can integrate integrating machine learning-based route retrieval systems into a voice assistant.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a digital assistance system, the method being performed by a processing circuit in which link information for at least two selectable retrieval systems is provided, the method comprising:

receiving a search query that requests answer data as an answer to the search query, wherein the search query concerns a travel route and/or a travel destination and/or a point of interest, POI;

recognizing, in the search query, at least one keyword describing the search query;

generating feature data that describes the at least one keyword and the search query;

selecting at least one selected retrieval system that is to retrieve the answer data among the at least two selectable retrieval systems based on the feature data; and sending the feature data to the at least one selected retrieval system using the link information, wherein the selecting includes providing selection data to a mapping function of the processing circuit as an input, wherein the mapping function maps the selection data to the link information and to score data of one or more of the at least two selectable retrieval systems to identify the at least one selected retrieval system, wherein the score data describe a score of a quality measure for each of the at least two selectable retrieval systems, wherein the score data are based on historic search queries sent to each of the at least two selectable retrieval systems before the feature data is sent to the at least one selected retrieval system, and wherein the selection data contain the search query and the at least one keyword.

2. The method according to claim 1, wherein the mapping function includes a look-up table and/or an artificial neural network that associates several different possible inputs to respective link information or to the score data.

3. The method according of claim 1, wherein the mapping function includes a k-means clustering algorithm in which each of a plurality of query classes that represents several different possible sets of selection data as a single common class is modeled as one of a plurality of clusters in a feature space and the input is mapped into the feature space and one of the clusters that is closest to a mapped input determines one of the query classes that is associated with the search query on which the input is based, and wherein at least one of the at least two selectable retrieval systems associated with the one of the query classes is selected as the at least one selected retrieval system.

4. The method according to claim 3, wherein the selection data contained in the input describe different parameters for mapping the input into the feature space, and each respective value of the different parameters is used as a coordinate value in the feature space.

5. The method according to claim 1, wherein the selection data contain the search query, the at least one keyword, and situation data describing at least one of:

a current position of the digital assistance system, the current position being expressed by geo-coordinates and/or by indicating a region and/or region type in which the digital assistance system is positioned;

a time of day and/or a season of a year;

current weather and/or estimated future weather as signaled by a weather station; and current traffic and/or estimated future traffic as indicated by a traffic system.

6. The method according to claim 5, wherein the generating the feature data includes adding the situation data as a part of the feature data.

7. The method according to claim 1, wherein the digital assistance system is operated in a vehicle.

8. The method according to claim 1, wherein the processing circuit is operated as part of the digital assistance system or wherein the processing circuit is provided as a distributed circuit that is partly operated in the digital assistance system and partly operated in a stationary server.

9. The method according to claim 1, wherein the receiving the search query includes:

wherein the receiving the search query includes receiving an acoustic speech signal of the search query; and wherein the recognizing the at least one keyword includes recognizing, in the speech signal, the at least one keyword contained in the speech signal.

10. A method of training a mapping function that selects at least one retrieval system out of a plurality of selectable retrieval systems, each selectable retrieval system retrieving answer data based on feature data that describes a search query that concerns a travel route and/or a specific travel destination and/or point of interest, POI, the method comprising:

for each different search query of several different search queries that are each represented by respective feature data:

sending the respective feature data to each of the selectable retrieval systems and receiving respective answer data from each of the selectable retrieval systems as an answer to the different search query;

applying an evaluation function that compares the answer data of the retrieval systems based on a quality measure and that identifies a best retrieval system which provides the answer data with a smallest or largest value with respect of the quality measure; and associating the feature data, the different search query, and at least one keyword contained in the different search query with the best retrieval system identified by the evaluation function in the mapping function such that the mapping function will identify the best retrieval system in response to an input including the feature data.

11. The method according to claim 10, wherein the quality measure includes:

a travelling distance and/or haversine distance from a current position of a user to a respective destination that is indicated in the answer data; and/or a time to reach the respective destination.

12. The method according to claim 10, wherein the quality measure indicates that the answer data is temporarily stored in a storage and a user is observed with regard to a travel route that is actually taken by the user and/or with regard to a next travel stop that is actually used by the user, and wherein one of the selectable retrieval systems that best predicted the travel route and/or the travel stop by corresponding answer data is identified as the best retrieval system for the search query.

13. The method according to claim 10, wherein the quality measure indicates that a probabilistic score is used that combines results of several of the search queries to identify the best retrieval system by using an artificial neural network and/or a k-means algorithm for representing several different possible combinations of keywords as a single query class.

14. The method according to claim 13, wherein the method is performed several times for iteratively training the mapping function in order to adapt the mapping function to a change in the retrieval systems.

15. A processing circuit comprising:

at least one processor; and at least one memory storing instructions that, when executed by the at least one processor, cause the processing circuit to:

store link information for at least two selectable retrieval systems;

receive a search query that requests answer data as an answer to the search query, wherein the search query concerns a travel route and/or a travel destination and/or a point of interest, POI;

recognize, in the search query, at least one keyword describing the search query;

generate feature data that describes the at least one keyword and the search query;

select at least one selected retrieval system that is to retrieve the answer data among the at least two selectable retrieval systems based on the feature data; and send the feature data to the at least one selected retrieval system using the link information, wherein, to select the at least one selected retrieval system, the processing circuit provides selection data to a mapping function of the processing circuit as an input, wherein the mapping function maps the selection data to the link information and/or to score data of one or more of the at least two selectable retrieval systems to identify the at least one selected retrieval system, wherein the score data describe a score of a quality measure for each of the at least two selectable retrieval systems, wherein the score data are based on historic search queries sent to each of the at least two selectable retrieval systems before the feature data is sent to the at least one selected retrieval system, and wherein the selection data contain the search query and the at least one keyword.

16. The processing circuit according to claim 15, wherein the link information includes at least first link information for a first one of the at least two selectable retrieval systems and second link information for a second one of the at least two selectable retrieval systems, wherein the first link information includes a first unified resource locator and/or a first Internet Protocol (IP) address and/or a first Application Programming Interface (API) for the first one of the at least two selectable retrieval systems, and wherein the second link information includes a second unified resource locator and/or a second IP address and/or a second API for the second one of the at least two selectable retrieval systems.

17. The method according to claim 1, wherein the link information includes at least first link information for a first one of the at least two selectable retrieval systems and second link information for a second one of the at least two selectable retrieval systems, wherein the first link information includes a first unified resource locator and/or a first Internet Protocol (IP) address and/or a first Application Programming Interface (API) for the first one of the at least two selectable retrieval systems, and wherein the second link information includes a second unified resource locator and/or a second IP address and/or a second API for the second one of the at least two selectable retrieval systems.

* * * * *